(12) United States Patent
Andreakis et al.

(10) Patent No.: US 11,334,554 B2
(45) Date of Patent: May 17, 2022

(54) WATERMARK-BASED TECHNIQUES FOR CHANGE-DATA-CAPTURE

(71) Applicant: NETFLIX, INC., Los Gatos, CA (US)

(72) Inventors: Andreas Andreakis, Santa Clara, CA (US); Ioannis Papapanagiotou, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/105,830

(22) Filed: Nov. 27, 2020

(65) Prior Publication Data

US 2021/0182267 A1 Jun. 17, 2021

Related U.S. Application Data

(60) Provisional application No. 62/985,270, filed on Mar. 4, 2020, provisional application No. 62/948,763, filed on Dec. 16, 2019.

(51) Int. Cl.
  *G06F 16/00* (2019.01)
  *G06F 16/23* (2019.01)

(52) U.S. Cl.
  CPC ...... *G06F 16/2358* (2019.01); *G06F 16/2308* (2019.01); *G06F 16/2365* (2019.01)

(58) Field of Classification Search
  CPC .... G06F 16/27; G06F 16/2308; G06F 16/219; G06F 16/2365; G06F 16/2358
  See application file for complete search history.

(56) References Cited

U.S. PATENT DOCUMENTS

| 7,783,601 B2 | 8/2010 | Wong et al. |
| 8,121,978 B2 | 2/2012 | Wiss et al. |
| 11,120,047 B1* | 9/2021 | Hoffmann ........... G06F 16/2358 |
| 2019/0332582 A1 | 10/2019 | Kumar et al. |

OTHER PUBLICATIONS

Caballe et al., "Distributed-Based Massive Processing of Activity Logs for Efficient User Modeling in a Virtual Campus," Cluster Comput, 2013, Springer Science Business Media, Apr. 10, 2013, pp. 1-17. (Year: 2013).*

Heidarzadeh et al., "Overlapped Chunked Network Coding", Department of Systems and Computer Engineering, IEEE Xplore, 2010, pp. 1-5. (Year: 2010).*

(Continued)

*Primary Examiner* — Cheryl Lewis
(74) *Attorney, Agent, or Firm* — Artegis Law Group, LLP

(57) ABSTRACT

Various embodiments set forth systems and techniques for concurrent log and dump processing. The techniques include selecting, from a datastore, a chunk comprising one or more rows of data; comparing the one or more rows of data in the chunk with a first set of log events in a change log associated with the datastore, wherein each log event included in the first set of log events occurs after a first log event in the change log and prior to a second log event in the change log; selecting, based on the comparison, one or more non-conflicting rows in the chunk; and transmitting, to an output, one or more log events associated with the one or more non-conflicting rows in the chunk prior to processing a second set of log events in the change log, wherein the second set of log events occur after the second log event.

20 Claims, 8 Drawing Sheets

(56) References Cited

OTHER PUBLICATIONS

Apache, "Apache Zookeeper", Retrieved from https://zookeeper.apache.org, on Sep. 7, 2021, 2010, 1 page.
Elasticsearch Guide [7.6], "Optimistic concurrency control", Retrieved from https://www.elastic.co/guide/en/elasticsearch/reference/7.6/optimistic-concurrency-control.html, on Sep. 7, 2021, 2020, 3 pages.
Elasticsearch Guide [7.6], "Versioning", Retrieved from https://www:elastic.co/guide/en/elasticsearch/reference/7.6/docs-delete.html#delete-versioning, on Sep. 7, 2021, 2020, 4 pages.
MySQL, "MySQL 5.7 Reference Manual—5.4.4 The Binary Log", Retrieved from https://dev.mysql.com/doc/refman/5.7/en/binary-log.html, on Sep. 7, 2021, 2020, 6 pages.
MySQL, "MySQL 5.7 Reference Manual—14.7.2.3 Consistent Nonlocking Reads", Retrieved from https://dev.mysql.com/doc/refman/5.7/en/innodb-consistent-read.html, on Sep. 7, 2021, 2020, 3 pages.
MySQL, "MySQL 5.7 Reference Manual—16.1.2.3 Obtaining the Replication Source's Binary Log Coordinates", Retrieved from https://dev.mysql.com/doc/refman/5.7/en/replication-howto-masterstatus.html, on Sep. 7, 2021, 2020, 2 pages.
MySQL, "MySQL Internals Manual—14.9.4 Binlog Event", Retrieved from https://dev.mysql.com/doc/internals/en/binlog-event.html, on Sep. 14, 2021, 2020, 3 pages.
PostgreSQL, "PostgreSQL 9.6.17 Documentation—Logical Decoding Output Plugins", Retrieved from https://www.postgresql.org/docs/9.6/logicaldecoding-output-plugin.html, on Sep. 7, 2021, 2020, 4 pages.
PostgreSQL, "PostgreSQL 9.6.17 Documentation—System Administration Functions", Retrieved from https://www.postgresql.org/docs/9.6/functions-admin:html#functions-admin-backup, on Sep. 13, 2021, 2020, 10 pages.
PostgreSQL, "PostgreSQL 9.6.17 Documentation—Transaction Isolation", Retrieved from https://www.postgresql.org/docs/9.6/transaction-iso.html#XACT-read-commited, on Sep. 7, 2021, 2020, 5 pages.
Airbnb, "Change Data Capture (CDC) service", SpinalTap, Retrieved from https://github:com/airbnb/SpinalTap, on Sep. 7, 2021, 2018, 5 pages.
Andreakis et al., "Delta: A Data Synchronization and Enrichment Platform", Retrieved from https://netflixtechblog:com/delta-a-data-synchronization-and-enrichment-platform-e82c36a79aee, on Sep. 14, 2021, Oct. 15, 2019, 10 pages.
Mehta ete al., "Transactions in Apache Kafka", Confluent, Retrieved from https://www.confluent.io/blog/transactions-apache-kafka/, on Sep. 14, 2021, Nov. 2017, 11 pages.
Carbone et al., "State Management in Apache Flink", Consistent Stateful Distributed Stream Processing, Proceedings of the VLDB Endowment, vol. 10, No. 12, Aug. 2017, pp. 1718-1729.
Das et al., "All Aboard the Databus!: Linkedin's Scalable Consistent Change Data Capture Platform", SoCC, Oct. 14-17, 2012, 14 pages.
MariaDB Knowledge Base, "Enhancements for Start Transaction with Consistent Snapshot", Retrieved from https://mariadb.com/kb/en/enhancements-for-start-transaction-with-consistent-snapshot/, on Sep. 7, 2021, 2020, 2 pages.
GitHub, "Debezium—Change data capture for a variety of databases", Retrieved from https://github.com/debezium/debezium, on Sep. 14, 2021, 2019, 10 pages.
Junqueira et al., "ZooKeeper: Distributed Process Coordination", O'Reilly Media, Inc., 1st Edition, Nov. 2013, 238 pages.
Kleppmann, Martin, "Designing Data-Intensive Applications", The Big Ideas Behind Reliable, Scalable, and Maintainable Systems, O'Reilly, Mar. 2017, 585 pages.
Kleppmann et al., "Online Event Processing", Communications of the ACM, vol. 62, No. 5, DOI:10.1145/3312527, May 2019, pp. 43-49.
Kleppmann, Martin, "Using logs to build a solid data infrastructure (or: why dual writes are a bad idea)", Confluent, Retrieved from https://www:confluent:io/blog/using-logs-to-build-a-solid-data-infrastructure-or-why-dual-writes-are-a-bad-idea, on Sep. 14, 2021, May 2015, 22 pages.
Lakshman et al., "Cassandra—A Decentralized Structured Storage System", ACM SIGOPS Operating Systems Review, vol. 44, No. 2, 2010, pp. 35-40.
Shankar, Prem Santosh Udaya, "Streaming MySQL tables in real-time to Kafka", Retrieved from https://engineeringblog.yelp.com/2016/08/streaming-mysql-tables-in-real-time-to-kafka.html, on Sep. 14, 2021, Aug. 2016, 8 pages.
Sharma et al., "Wormhole: Reliable Pub-Sub to Support Geo-replicated Internet Services", In 12th USENIX Symposium on Networked Systems Design and Implementation (NSDI 15), USENIX Association., May 4-6, 2015, pp. 351-366.
GitHub, "shyiko/mysql-binlog-connector-java: MySQL Binary Log connector", Retrieved from https://github.com/shyiko/mysql-binlog-connector-java, on Sep. 7, 2021, 2010, 8 pages.
GitHub, "eulerto/wal2json: JSON output plugin for changeset extraction", Retrieved from https://github.com/eulerto/wal2json, on Sep. 7, 2021, 2014, 14 pages.
Verbitski et al., "Amazon Aurora: Design Considerations for High Throughput Cloud-Native Relational Databases", In Proceedings of the 2017 ACM International Conference on Management of Data, DOI: http://dx.doi.org/10.1145/3035918.3056101, May 14-19, 2017, pp. 1041-1052.
Viotti et al., "Consistency in Non-Transactional Distributed Storage Systems", ACM Computing Surveys, vol. 49, No. 1, Article 19, DOI: http://dx.doi.org/10.1145/2926965, Jun. 2016, pp. 19:1-19:34.
Wang et al., "Building a Replicated Logging System with Apache Kafka", Proceedings of the VLDB Endowment, vol. 8, No. 12, Aug. 2015, pp. 1654-1655.
Xu, Z, "Keystone Real-time Stream Processing Platform", Netflix Technology Blog, Retrieved from https://netflixtechblog:com/keystone-real-time-stream-processing-platform-a3ee651812a, on Sep. 13, 2021, Sep. 2018, 17 pages.
Zendesk, "Maxwell's Daemon", a MySQL-to-JSON Kafka producer, Retrieved from https://github.com/zendesk/maxwell, on Sep. 14, 2021, 2014, 2 pages.
Dehghani, Zhamak, "How to Move Beyond a Monolithic Data Lake to a Distributed Data Mesh", Retrieved from https://martinfowler.com/articles/data-monolith-to-mesh.html, on Sep. 7, 2021, May 2019, 29 pages.
GitHub, "Yelp MySQL Streamer", MySQLStreamer is a database change data capture and publish system, Retrieved from https://github.com/Yelp/mysql_streamer, on Sep. 14, 2021, 4 pages.
International Search Report for application No. PCT/US2020/064657 dated Mar. 31, 2021.
Andreakis et al., "Delta: A Data Synchronization and Enrichment Platform", Netflix Technology Blog, Retrieved from the Internet:URL:https://netflixtechblog.com/delta-a-data-synchronization-andenrichment-platform-e82c36a 79aee on Mar. 18, 2021, XP055787361, Oct. 15, 2019, 10 pages.
Das et al., "All Aboard the Databus!", Proceedings of the Third ACM Symposium on Cloud Computing, SOCC '12, XP055709751, DOI: 10.1145/2391229.2391247, ISBN: 978-1-4503-1761-0, Oct. 14-17, 2012, pp. 1-14.

\* cited by examiner

WATERMARK-BASED TECHNIQUES FOR CHANGE-DATA-CAPTURE

CROSS-REFERENCE TO RELATED APPLICATIONS

This application claims priority benefit of the U.S. Provisional Patent Application titled, "TECHNIQUES AND FRAMEWORK FOR CHANGE-DATA-CAPTURE," filed on Dec. 16, 2019 and having Ser. No. 62/948,763; and United States Provisional Patent Application titled, "WATERMARK-BASED CHANGE-DATA-CAPTURE FRAMEWORK AND RELATED TECHNIQUES," filed on Mar. 4, 2020 and having Ser. No. 62/985,270. The subject matter of these related applications is hereby incorporated herein by reference.

BACKGROUND

Field of the Various Embodiments

Embodiments of the present disclosure relate generally to databases, and, more specifically, to watermark-based techniques for change-data-capture.

Description of the Related Art

Many applications utilize multiple heterogeneous datastores, with each datastore serving different needs (e.g., storing the canonical form of data, providing advanced search capabilities, caching). One of these datastores typically serves as the source datastore, while the others are derived datastores. In order to maintain proper functionality, applications that rely on multi-datastore environments typically need to keep these multiple datastores synchronized.

Some applications rely on traditional multi-datastore synchronization techniques such as dual-writes, distributed transactions, or the like to address data synchronization and event processing. However, these traditional data synchronization techniques have limitations related to feasibility, robustness, maintenance, or the like. Such limitations include datastores remaining out of sync until a repair routine is applied, complications arising when more than two datastores are involved, inconsistent features and behavior across different datastores, heterogeneous transaction models, or the like.

Change-Data-Capture (CDC) techniques address some of the limitations of traditional multi-datastore synchronization techniques by allowing for capturing of committed changes from a source datastore in near real-time and enabling propagation of those changes to derived datastores, downstream consumers, or the like. In many databases, transaction logs are the source of CDC events. However, since transaction logs often have limited retention, these transaction logs are not guaranteed to contain the full history of changes of the source datastore, which is required for derived datastores to eventually store the full state of the source datastore.

Most prior art techniques do not augment the transaction log. One prior art technique addresses this limitation by augmenting transaction logs with dumps that capture the full state of a source datastore. However, such prior art techniques have many limitations. First, some prior art techniques stop the processing of log events while a dump is in progress, which can result in log event processing being stalled for an extended period of time, especially when a dump has a large volume. Such halting of log event processing can create issues for downstream customers who rely on short propagation delays of real-time changes. Second, some prior art techniques execute dump processing only during a bootstrap phase or when data loss is detected on a transaction log and not on an ongoing basis. Third, some prior art techniques coordinate log processing and dump processing by locking tables during dump processing, resulting in write traffic being blocked until dump processing is complete and thereby disrupting the propagation of real-time changes. Fourth, some prior art techniques rely on advanced database features that are not transferable across database systems, preventing code reuse in the heterogeneous multi-datastore environments that contain different kinds of database systems.

Accordingly, there is a need for techniques that allow for concurrent log and dump processing across multiple generic databases in a multi-datastore environment so that both dumps and transaction log processing can make progress side-by-side.

SUMMARY

One embodiment of the present invention sets forth a computer-implemented method for concurrent log and dump processing, the method comprising selecting, from a datastore, a chunk comprising one or more rows of data; comparing the one or more rows of data in the chunk with a first set of log events in a change log associated with the datastore, wherein each log event included in the first set of log events occurs after a first log event in the change log and prior to a second log event in the change log; selecting, based on the comparison, one or more non-conflicting rows in the chunk; and transmitting, to an output, one or more log events associated with the one or more non-conflicting rows in the chunk prior to processing a second set of log events in the change log, wherein the second set of log events occur after the second log event.

Other embodiments include, without limitation, a computer system that performs one or more aspects of the disclosed techniques, as well as one or more non-transitory computer-readable storage media including instructions for performing one or more aspects of the disclosed techniques.

Disclosed techniques allow for concurrent log and dump processing, enabling high availability of real-time events to downstream consumers, and reducing propagation delays from the source datastore to the derived datastores by capturing dumps reflecting the full state of the source datastore via chunks interleaved with the real-time events. Disclosed techniques also allow downstream customers to trigger, pause, or resume dumps after the last completed chunk at any time, thereby allow for real-time and efficient customization of the log and dump processing without needing to restart the dump processing from the beginning. Additionally, disclosed techniques do not require locks on tables, thereby minimizing the impact on bandwidth and write traffic in databases. Further, disclosed techniques can be configured for a variety of relational databases, allowing for consistent behavior when deployed in heterogeneous multi-datastore environments that contain different kinds of database systems.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
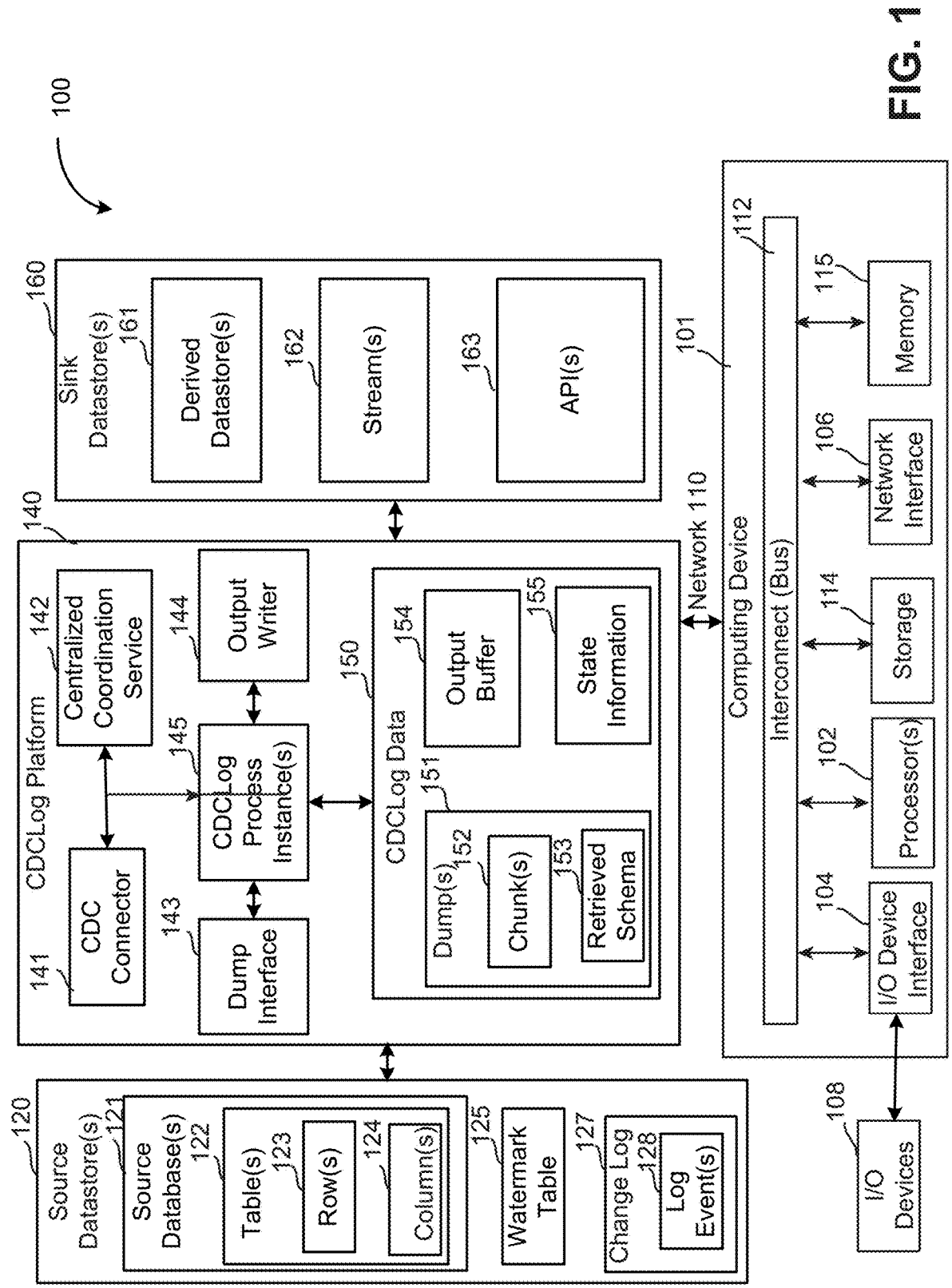
FIG. 1 is a schematic diagram illustrating a computing system 100 configured to implement one or more aspects of the present disclosure.

In the following description, numerous specific details are set forth to provide a more thorough understanding of the various embodiments. However, it will be apparent to one skilled in the art that the inventive concepts may be practiced without one or more of these specific details.

Many applications that rely on multi-datastore environments need to keep these multiple datastores synchronized. Some applications rely on traditional multi-datastore synchronization techniques such as dual-writes, distributed transactions, or the like. Such traditional multi-datastore synchronization techniques have limitations including datastores remaining out of sync until a repair routine is applied, complications arising when more than two datastores are involved, inconsistent features and behavior across different datastores, heterogeneous transaction models, or the like.

Some applications rely on Change-Data-Capture (CDC) techniques, which address some of the limitations of traditional multi-datastore synchronization techniques by allowing for capturing of committed changes from a source datastore in near real-time and enabling propagation of those changes to derived datastores, downstream consumers, or the like. However, many CDC techniques rely on transaction logs, which often have limited retention and are not guaranteed to contain the full history of changes of the source datastore. Prior-art techniques that have tried to address limitations of CDC techniques have many limitations, including propagation delays caused when processing of log events is stopped while a dump is in progress, limitations regarding when dump processing can be executed (e.g., only during a bootstrap phase or when data loss is detected on a transaction log), disruption in propagation of real time changes due to reliance on techniques that block write traffic to tables during dump processing, and reliance on non-transferrable advanced database features that cannot be used in heterogeneous multi-datastore environments.

In contrast, disclosed techniques allow for concurrent log and dump processing across multiple generic databases in a multi-datastore environment. In disclosed embodiments, watermark based log and dump processing begins when a CDCLog process instance pauses the log event processing of a change log that includes one or more log events associated with one or more changes in source datastore(s). When the log event processing is paused, CDCLog process instance generates, in a watermark table, a low watermark entry. CDCLog process instance selects, from source datastore(s), a chunk comprising one or more rows of data. CDCLog process instance stores the chunk in memory, indexed by primary key. CDCLog process instance generates, in the watermark table, a high watermark entry and then resumes log event processing of the change log. CDCLog process instance determines whether a low watermark event associated with the low watermark entry has been received.

When a low watermark event has been received, CDCLog process instance compares the one or more rows in the chunk with one or more log events occurring after the low watermark event in the change log to determine one or more conflicting rows. CDCLog process instance removes one or more conflicting rows from the chunk. CDCLog process instance determines whether a high watermark event associated with the high watermark entry has been received. When a high watermark event has been received, CDCLog process instance generates an event for each of the non-conflicting rows in the chunk. CDCLog process instance send events associated with the non-conflicting rows in the chunk to the output (e.g., a sink datastore) prior to processing any further log events in change log.

Advantageous, disclosed techniques allow for concurrent log and dump processing, enabling high availability of real-time events to downstream consumers, and reducing propagation delays from the source datastore to the derived datastores by capturing dumps reflecting the full state of the source datastore via chunks interleaved with the real-time events. Disclosed techniques also allow downstream customers to trigger, pause, or resume dumps after the last completed chunk at any time, thereby allow for real-time and efficient customization of the log and dump processing without needing to restart the dump processing from the beginning. Additionally, disclosed techniques do not require locks on tables, thereby minimizing the impact on bandwidth and write traffic in databases. Further, disclosed techniques can be configured for a variety of relational databases, allowing for consistent behavior when deployed in heterogeneous multi-datastore environments that contain different kinds of database systems.

FIG. 1 illustrates a computing system 100 configured to implement one or more aspects of the present disclosure. As shown, computing system 100 includes, without limitation, computing device 101, source datastore(s) 120, Change-Data-Capture Log (CDCLog) platform 140, and sink datastore(s) 160.

Computing device 101 includes an interconnect (bus) 112 that connects one or more processor(s) 102, an input/output (I/O) device interface 104 coupled to one or more input/output (I/O) devices 108, memory 115, a storage 114, and a network interface 106 coupled to network 110.

Computing device 101 includes a desktop computer, a laptop computer, a smart phone, a personal digital assistant (PDA), tablet computer, or any other type of computing device configured to receive input, process data, and optionally display images, and is suitable for practicing one or more embodiments. Computing device 101 described herein is illustrative and that any other technically feasible configurations fall within the scope of the present disclosure.

In some embodiments, computing device 101 includes any technically feasible internet-based computing system, such as a distributed computing system or a cloud-based storage system. In some embodiments, computing device 101 includes, without limitation, a plurality of networks, a plurality of servers, a plurality of operating systems, a plurality of storage devices, or the like. The server may be a standalone server, a cluster or "farm" of servers, one or more network appliances, or any other device suitable for implementing one or more aspects of the present disclosure.

Interconnect (bus) 112 includes one or more reconfigurable interconnects that links one or more components of computing device 101 such as one or more processors, one or more input/output ports, storage, memory, or the like. In some embodiments, interconnect (bus) 112 combines the functions of a data bus, an address bus, a control bus, or the like. In some embodiments, interconnect (bus) 112 includes an I/O bus, a single system bus, a shared system bus, a local bus, a peripheral bus, an external bus, a dual independent bus, or the like.

Processor(s) 102 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, processor(s) 102 may be any technically feasible hardware unit capable of processing data and/or executing software applications. Further, in the context of this disclosure, the computing elements shown in computing device 101 may correspond to a physical computing system (e.g., a system in a data center) or may be a virtual computing instance executing within a computing cloud.

I/O device interface 104 enables communication of I/O devices 108 with processor(s) 102. I/O device interface 104 generally includes the requisite logic for interpreting addresses corresponding to I/O devices 108 that are generated by processor(s) 102. I/O device interface 104 may also be configured to implement handshaking between processor(s) 102 and I/O devices 108, and/or generate interrupts associated with I/O devices 108. I/O device interface 104 may be implemented as any technically feasible CPU, ASIC, FPGA, any other type of processing unit or device.

I/O devices 108 include devices capable of providing input, such as a keyboard, a mouse, a touch-sensitive screen, a microphone, a remote control, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user of computing system 100, and to also provide various types of output to the end-user of computing system 100, such as displayed digital images or digital videos or text. In some embodiments, one or more of I/O devices 108 are configured to couple computing system 100 to a network 110.

In some embodiments, I/O devices 108 can include, without limitation, a smart device such a personal computer, personal digital assistant, tablet computer, mobile phone, smart phone, media player, mobile device, or any other device suitable for implementing one or more aspects of the present invention. I/O devices 108 can augment the functionality of computing system 100 by providing various services, including, without limitation, telephone services, navigation services, infotainment services, or the like. Further, I/O devices 108 can acquire data from sensors and transmit the data to computing system 100. I/O devices 108 can acquire sound data via an audio input device and transmits the sound data to computing system 100 for processing. Likewise, I/O devices 108 can receive sound data from computing system 100 and transmit the sound data to an audio output device so that the user can hear audio originating from computing system 100. In some embodiments, I/O devices 108 include sensors configured to acquire biometric data from the user (e.g., heartrate, skin conductance, or the like) and transmit signals associated with the biometric data to computing system 100. The biometric data acquired by the sensors can then be processed by a software application running on computing system 100. In various embodiments, I/O devices 108 include any type of image sensor, electrical sensor, biometric sensor, or the like, that is capable of acquiring biometric data including, for example and without limitation, a camera, an electrode, a microphone, or the like.

In some embodiments, I/O devices 108 include, without limitation, input devices, output devices, and devices capable of both receiving input data and generating output data. I/O devices 108 can include, without limitation, wired or wireless communication devices that send data to or receive data from smart devices, headphones, smart speakers, sensors, remote databases, other computing devices, or the like. Additionally, in some embodiments, I/O devices 108 may include a push-to-talk (PTT) button, such as a PTT button included in a vehicle, on a mobile device, on a smart speaker, or the like.

Storage 114 includes non-volatile storage for applications and data, and may include fixed or removable disk drives, flash memory devices, and CD-ROM, DVD-ROM, Blu-Ray, HD-DVD, or other magnetic, optical, solid state storage devices, or the like. In some embodiments, any of the software programs on CDCLog Platform 140 are stored in storage 114 and loaded into memory 115 on computing device 101 when executed.

Memory 115 includes a random access memory (RAM) module, a flash memory unit, or any other type of technically feasible memory unit or combination thereof on computing device 101. Processor(s) 102, I/O device interface 104, and network interface 106 are configured to read data from and write data to memory 115. In some embodiments, any of the software programs on CDCLog Platform 140 are stored in memory 115 on computing device 101.

Network 110 includes any technically feasible type of communications network that allows data to be exchanged between computing system 100 and external entities or devices, such as a web server or another networked computing device. For example, network 110 may include a wide area network (WAN), a local area network (LAN), a wireless (WiFi) network, and/or the Internet, among others.

Network interface 106 is a computer hardware component that connects processor 102 to a communication network. Network interface 106 may be implemented in computing system 100 as a stand-alone card, processor, or other hardware device. In some embodiments, network interface 106 may be configured with cellular communication capability, satellite telephone communication capability, a wireless WAN communication capability, or other types of communication capabilities that allow for communication with a communication network and other computing devices external to computing system 100.

Source datastore(s) 120 include any technically feasible storage infrastructure for storing and managing collections of data. In some embodiments, source datastore(s) 120 include one or more event producers, one or more heterogeneous datastores, one or more relational databases, one or more file systems, one or more distributed datastores, one or more directory services, one or more active databases, one or more cloud databases, one or more data warehouses, one or more distributed databases, one or more embedded database systems, one or more document-oriented databases, one or more federated database systems, one or more array database management systems, one or more real-time databases, one or more temporal databases, one or more logic databases, or the like. In some embodiments, source datastore(s) 120 operate on a plurality of servers, a plurality of storage devices, or the like. The server may be a standalone server, a cluster or "farm" of servers, one or more network appliances, or the like. In some embodiments, source datastore(s) 120 include data managed by one or more teams, one or more business entities, or the like. Source datastore(s) 120 include, without limitation, source database(s) 121, watermark table 125, and change log 127.

Source database(s) 121 include any technically feasible collection of one or more sets of related data. In some embodiments, source database(s) 121 include one or more active databases, one or more cloud databases, one or more relational databases, one or more data warehouses, one or more distributed databases, one or more embedded database systems, one or more document-oriented databases, one or more federated database systems, one or more array database management systems, one or more real-time databases, one or more temporal databases, one or more logic databases, or the like. In some embodiments, source database(s) 121 include a database management system configured to provide an interface for interaction between source database(s) 121 and users, applications, or the like. Source database(s) 121 include, without limitation, table(s) 122.

Table(s) 122 include any technically feasible organization of related data in a table format or the like. In some embodiments, table(s) 122 include one or more sets of attributes, data elements, data values, or the like. In some embodiments, table(s) 122 are associated with metadata, constraints, or the like. Table(s) 122 include, without limitation, one or more column(s) 124 and one or more row(s) 123.

Column(s) 124 include one or more set of data values of a particular type such as text values, numbers, points, or the like. In some embodiments, column(s) 124 are associated with one or more sets of attributes, one or more fields, or the like. In some embodiments, column(s) 124 include one or more columns designated as a primary key by which row(s) 123 can be uniquely identified, cross-referenced, or the like. In some embodiments, column(s) 124 include natural keys derived from application data, surrogate keys associated with an object or an entity, alternate keys, or the like.

Row(s) 123 include one or more structured data items associated with table(s) 122. In some embodiments, row(s) 123 include a succession of data values arranged in one or more column(s) 124. In some embodiments, row(s) 123 include an ordered sequence of data elements or the like. In some embodiments, each row 123 includes a single structured data value or the like.

Watermark table 125 includes any table in source datastore(s) 120 configured to store a row of data or the like. In some embodiments, watermark table 125 is stored in a dedicated namespace to prevent collision with application tables in source datastore(s) 120. In some embodiments, watermark table 125 includes a single row of data which stores a Universally Unique Identifier (UUID) field. In some embodiments, a watermark (e.g., low watermark, high watermark) is generated by updating the row to reflect a specific UUID value. In some embodiments, the row update results in a change event which is captured and eventually received through change log 127.

Change log 127 includes any technically feasible history of actions executed or performed on source datastore(s) 120 or the like. In some embodiments, change log 127 includes a log of one or more log event(s) 128 reflecting one or more changes in source datastore(s) 120 (e.g., changed rows, changed column schema, or the like). In some embodiments, the change log 127 includes a linear history of committed changes and non-stale reads associated with source datastore(s) 120.

In some embodiments, log event(s) 128 include any event emitted by source datastore(s) 120 based on changes to rows, columns, or the like. In some embodiments, the log event(s) 128 may be emitted in real-time. In some embodiments, log event(s) 128 are of one or more types including create, update, delete, or the like. In some embodiments, log event(s) 128 are associated with one or more attributes including a log sequence number (LSN), the column values at the time of the operation (e.g., column title at a given point in time or the like), the schema that applied at the time of the operation, the full pre and post image of the row from the time of the change, a link to the last log record, type of database log record, information associated with the change that triggered the log record to be written, or the like.

Sink datastore(s) 160 include any technically feasible storage infrastructure for storing and managing collections of data. In some embodiments, sink datastore(s) 160 include one or more heterogeneous datastores, one or more relational databases, one or more file systems, one or more distributed datastores, one or more directory services, one or more active databases, one or more cloud databases, one or more data warehouses, one or more distributed databases, one or more embedded database systems, one or more document-oriented databases, one or more federated database systems, one or more array database management systems, one or more real-time databases, one or more temporal databases, one or more logic databases, or the like. In some embodiments, sink datastore(s) 160 operate on a plurality of servers, a plurality of storage devices, or the like. The server may be a standalone server, a cluster or "farm" of servers, one or more network appliances, or the like. In some embodiments, sink datastore(s) 160 include data managed by one or more teams, one or more business entities, or the like. In some embodiments, sink datastore(s) 160 include any downstream application configured to propagate received events (e.g., stream processing application, data analytics platform), search index, cache, or the like. Sink datastore(s) 160 includes, without limitation, derived datastore(s) 161, stream(s) 162 and application programming interfaces (API(s)) 163.

Derived datastore(s) 161 include any technically feasible storage infrastructure storing data derived from source datastore(s) 120. In some embodiments, derived datastore(s) 161 include one or more heterogeneous datastores, one or more relational databases, one or more file systems, one or more distributed datastores, one or more directory services, one or more active databases, one or more cloud databases, one or more data warehouses, one or more distributed databases, one or more embedded database systems, one or more document-oriented databases, one or more federated database systems, one or more array database management systems, one or more real-time databases, one or more temporal databases, one or more logic databases, or the like.

Stream(s) 162 include any technically feasible software for handling real-time data feeds, including stream processing applications or the like. In some embodiments, stream(s) 162 includes functionality to allow users to receive output from CDCLog platform 140 and publish the data to any system or real-time application or the like. In some embodiments, stream(s) 162 sores key-value messages associated with one or more source datastore(s) 120, partitions the data into one or more partitions, order messaged within each partition based on an offset associated with the position of a message within the partition, index and store messages with a timestamp, or the like. In some embodiments, stream(s) 162 is configured to allow one or more processes to read messages from the one or more partitions or the like.

API(s) 163 include any technically feasible programming interface that enables propagation of output produced by output writer 144 or the like. In some embodiments, API(s) 163 include functionality to enable programming of output writer 144. In some embodiments, API 163 include functionality to read configuration data stored in output writer 144.

CDCLog platform 140 includes any technically feasible Internet-based computing system, such as a distributed computing system or a cloud-based storage system. In some embodiments, CDCLog platform 140 includes, without limitation, a plurality of networks, a plurality of servers, a plurality of operating systems, a plurality of storage devices, or the like. The server may be a standalone server, a cluster or "farm" of servers, one or more network appliances, or any other device suitable for implementing one or more aspects of the present disclosure. CDCLog platform 140 includes, without limitation, Change-Data-Capture (CDC) connector 141, centralized coordination service 142, dump interface 143, output writer 144, CDCLog process instance(s) 145, and CDCLog data 150.

CDC connector 141 includes any technically feasible connector configured to provide data transportation infrastructure for routing and publishing one or more events. The one or more events may be routing and/or publishing by the CDC connector 141 in real-time. In some embodiments, CDC connector 141 publishes events to the transport layer in a bus architecture or the like. In some embodiments, CDC connector 141 is configured to capture committed changes from source datastore(s) 120 in real-time from change log 127, dump(s) 151, or the like, and propagate the changes to sink datastore(s) 160 or the like. In some embodiments, CDC connector 141 includes an algorithm configured to optimize the flow of events to minimize propagation delays from source datastore(s) 120 to sink datastore(s) 160 or the like. In some embodiments, CDC connector 141 includes functionality associated with custom wire format, serialization (e.g., keeping track of different formats of payload to optimize on transportation and storage), batching, throttling, dynamic switching between one or more source database(s) 121, data enrichment, data synchronization, or the like.

In some embodiments, CDC connector 141 includes functionality associated with producing, collecting, processing, aggregating, and routing events. In some embodiments, CDC connector 141 includes functionality associated with deduplication, schematization, resilience, fault tolerance, or the like. In some embodiments, CDC connector 141 provides functionality that enables users to write custom processing logic (e.g., filter, transformation), build internal representation(s) of event processing steps, customize the interpretation of event processing steps, customize the initialization of one or more operators that execute event processing steps, or the like.

Centralized coordination service 142 includes any technically feasible service configured to provide one or more distributed services on CDCLog platform 140, including maintaining configuration or naming information, providing distributed synchronization, providing group management services and presence protocols, or the like. In some embodiments, centralized coordination service 142 includes functionality to automatically detect one or more failures (e.g., mismatch between view of container resources and container's runtime view, failure to elect a cluster leader, unclean leader election, unstable container resources with periodic restart/failure, network connectivity issues) and to perform one or more actions to correct the detected failure (e.g., proactive termination of affected containers, adjust job manager or task manager).

In some embodiments, when CDCLog platform 140 uses an active-passive architecture (e.g., with one active instance of CDCLog process instance(s) 145 and one or more passive standby instances of CDCLog process instance(s) 145), centralized coordination service 142 is configured to enable leader election to determine an active instance of CDCLog process instance(s) 145. In some embodiments, the leadership of a given instance of CDCLog process instance(s) 145 is a lease and is lost if not refreshed on time, allowing another instance of CDCLog process instance(s) 145 to take over. In some embodiments, centralized coordination service 142 checks whether a leadership lease is valid before executing a protected block of code, and uses concurrency control or the like to guard against outdated leaders.

Dump interface 143 includes any technically feasible programming interface that enables interaction with log and dump processing functionality on CDCLog platform 140. In some embodiments, dump interface 143 includes functionality to enable triggering of dumps on demand, scheduling of dumps, or the like. In some embodiments, dump interface 143 includes functionality to enable execution of dump requests for all tables 122, for a specific table in source datastore 120, for a specific set of primary keys of a table in source database 121, or the like. In some embodiments, dump interface 143 includes functionality to configure the size of one or more chunk(s) 152 of dump(s) 151. In some embodiments, dump interface 143 includes functionality to delay processing of one or more chunk(s) 152 and to allow only log processing for a predetermined period of time. In some embodiments, dump interface includes an algorithm that automatically determines the size of one or more chunk(s) 152, the timing of one or more delays in dump processing, or the like in order to meet one or more factors (e.g., system throughput requirements, one or more processing factors associated with CDCLog process instance(s) 145) or the like. In some embodiments, dump interface 143 includes one or more controls for controlling dump processing during runtime (e.g., throttling, pausing, resuming). In some embodiments, dump interface 143 includes functionality to check state information associated with log or dump processing, enable programming of configuration data associated with log or dump processing, or the like. In some embodiments, dump interface 143 provides functionality to enable users to build and operate custom log or dump processing applications or the like.

In some embodiments, dump interface 143 includes functionality to enable customization of one or more statistical properties associated with a target rate of dump processing (e.g., mean values for dump events emitted per second, minimum or maximum values of dump events emitted per second, standard deviation, range of values, median values, and/or the like). In some embodiments, the customization of the target rate of dump processing is based on the variations in one or more statistical properties associated with real-time bandwidth requirement of log processing events (e.g., mean values, minimum or maximum values, standard deviation, range of values, median values, and/or the like).

Output writer 144 includes any technically feasible write configured to collect one or more events and write to an output such as sink datastore(s) 160 or the like. In some embodiments, log and dump events are sent to the output using a non-blocking operation or the like. In some embodiments, output writer 144 runs its own thread and collects one or more events in an output buffer prior to writing the events to an output in order. In some embodiments, output writer includes retrieved schema 153 or an associated schema identifier in the output.

In some embodiments, the output buffer is stored in memory. In some embodiments, output writer 144 includes an interface configured to plugin to any output such as sink datastore(s) 160.

In some embodiments, output writer 144 includes an event serializer configured to serialize events into a customized format prior to appending the events to an output buffer, writing events to an output, or the like. In some embodiments, output writer 144 includes an interface to allow plugin of a custom formatter for serializing events in a customized format. In some events, output writer 144 appends events to an output buffer using one thread, and uses another thread to consume the events from the output buffer and send them to the output.

CDCLog process instance(s) 145 include any technically feasible processor configured to perform concurrent log and dump processing or the like. In some embodiments, CDCLog process instance(s) 145 are configured in an active-passive architecture, with one active instance of CDCLog process instance(s) 145 and one or more passive standby instances of CDCLog process instance(s) 145. In some embodiments, one or more CDCLog process instance(s) 145 are deployed for one or more availability zones, one or more regions, or the like.

In some embodiments, CDCLog process instance(s) 145 include one or more algorithms configured to customize the execution of concurrent log and dump processing based on one or more processing factors including job state (e.g., stateless parallel processing, large local states), job complexity (e.g., one or more parallel jobs with operators chained together, one or more shuffling stages, complex sessionization logic), windows or sessions information (e.g., range of window size required to capture a transaction start or end event, user behavior session windows), traffic pattern (e.g., bursty traffic pattern with sudden spikes, consistent or fixed traffic patterns), failure recovery (e.g., low failure recovery latency), backfill or rewind of processing job (e.g., replay of data from a batch source, dynamically switching source, rewind from a specified checkpoint), resource contention (e.g., CPU, network bandwidth, memory, network reliability), tuneable tradeoffs (e.g., duplicates versus latency, consistency versus availability, strict ordering versus random ordering), ordering of events (e.g., strict ordering assumptions, random ordering), delivery or processing guarantees (e.g., exactly-once processing guarantee, high durability guarantee, service level guarantee), domain specific platform requirements (e.g., streaming job lifecycle details, operation overhead, agility of development and deployment of changes), failure characteristics (e.g., zone failure, instance failure, cluster failure, network blips, inter-service congestion/backpressure, regional disaster failures, transient failure), cluster configuration (e.g., enabling or disabling unclean leader election based on availability versus durability tradeoff, default replication factor, minimum insync replicas, acknowledgement requirement), or the like.

CDCLog data 150 include any data associated with any component of CDCLog platform 140 including, without limitation, data associated with any of Change-Data-Capture (CDC) connector 141, centralized coordination service 142, dump interface 143, output writer 144, and CDCLog process instance(s) 145. CDCLog data 150 includes, without limitation, dump(s) 151, output buffer 154, and state information 155.

Dump(s) 151 include any data that captures the full state of any component of source datastore(s) 120, including, source database(s) 121, table(s) 122, column(s) 124, row(s) 123, or the like. In some embodiments, dump(s) 151 include the full state of all tables 122, a specific table in source datastore 120, a specific set of primary keys of a table in source database 121, or the like. Dump(s) 151 include one or more chunk(s) 152.

Chunk(s) 152 include one or more portions of dump(s) 151. In some embodiments, chunk(s) 152 are of a configurable size (e.g., 3 rows). In some embodiments, one or more chunk(s) 152 are selected for one or more row(s) 123 that meet a specified criteria (e.g., rows with primary key greater than a given integer, or the like). In some embodiments, a new chunk 152 are selected by sorting table(s) 122 using the primary key (e.g., ascending primary key order), and including one or more row(s) 123 where the primary key is greater than the last primary key of the previous chunk.

Retrieved schema 153 includes metadata information associated one or more columns(s) 124 such as column name, column type, primary key information, column values, change deltas associated with updates to column attributes, or the like. In some embodiments, the full schema of table(s) 122 is selected and registered in centralized coordination service 142 prior to initiating processing of change log 127. In some embodiments, retrieved schema 153 includes a full schema, a schema identifier associated with a schema, or the like.

Output buffer 154 includes one or more events stored in memory by output writer 144 prior to writing the events to an output such as sink datastore(s) 160. In some embodiments, the one or more events are serialized into a customized format prior to being appended to output buffer 154.

State information 155 includes any information associated with the state of any component, process, or the like in computing system 100. In some embodiments, state information includes information associated with the state of log and dump processing (e.g., current state, goal state, checkpoint state), the state of active or passive CDCLog process instance(s), or the like.

In operation, watermark based log and dump processing begins when CDCLog process instance 145 pauses the log event processing of change log 127 that includes one or more log events 128 associated with one or more changes in source datastore(s) 120. When the log event processing is paused, CDCLog process instance 145 generates, in watermark table 125, a low watermark entry. CDCLog process instance 145 selects, from source datastore(s) 120, chunk 152 comprising one or more rows of data. CDCLog process instance 145 stores chunk 152 in memory, indexed by primary key. CDCLog process instance 145 generates, in watermark table 125, a high watermark entry and then resumes log event processing of any further log events in change log 127.

CDCLog process instance 145 determines whether a low watermark event associated with the low watermark entry has been received. When a low watermark event has been received, CDCLog process instance 145 compares the one or more rows in chunk 152 with one or more log events 128 occurring after the low watermark event in the change log 127 to determine one or more conflicting rows. CDCLog process instance 145 removes one or more conflicting rows from chunk 152. CDCLog process instance 145 determines whether a high watermark event associated with the high watermark entry has been received. When a high watermark event has been received, CDCLog process instance 145 generates an event for each of the non-conflicting rows in chunk 152. CDCLog process instance 145 sends events associated with the non-conflicting rows in chunk 152 to the output (e.g., sink datastore(s) 160) prior to processing any further log events in change log 127.

Algorithm 1 is an example algorithm describing the watermark based log and dump processing:

---

Algorithm 1: Watermark-based Chunk Selection

```
         Input: table
(1)      pause log event processing
         lw := uuid( ), hw := uuid( )
(2)      update watermark table set value = lw
(3)      chunk := select next chunk from table
(4)      update watermark table set value = hw
(5)      resume log event processing
         inwindow := false
         // event processing loop:
         while true do
         | e := next event from changelog
         | if not inwindow then
         | | if e is not watermark then
         | | | append e to outputbuffer
         | | else if e is watermark with value lw then
         | | | inwindow := true
         | else
         | | if e is not watermark then
(6)      | | | if chunk contains e.key then
         | | | | remove e.key from chunk
         | | | append e to outputbuffer
         | | else if e is watermark with value hw then
(7)      | | | |for each row in chunk do
         | | | | append row to outputbuffer
         | // other steps of event processing loop
         L ...
```

---

As described in algorithm 1, CDCLog process instance 145 pauses log event processing for a certain amount of time (step 1). CDCLog process instance 145 generates high and low watermarks by updating watermark table 125 (steps 2 and 4). CDCLog process instance 145 selects chunk 152 between the two watermarks and stores the chunk 152 in memory (step 3). After the high watermark is written, CDCLog process instance 145 resumes log event processing, sending received log events to the output writer 144, and watching for the low watermark event in change log 127. Once the low watermark event is received, CDCLog process instance 145 removes conflicting rows from chunk 152 for all primary keys that changed between the watermarks (step 6). Once the high watermark event is received, CDCLog process instance 145 uses output writer 144 to append all remaining rows to the output buffer before processing log events again in a sequential manner (step 7). In some embodiments, CDCLog process instance 145 returns a state associated with the chunk selection of step 3, with the state representing committed changes up to a certain point in history. In some embodiments, CDCLog process instance 145 executes the chunk selection of step 3 on a specific position of change log 127, considering changes up to that point.

Algorithm 1 uses CDCLog process instance 145 to determine a window on change log 127 which will necessarily contain the chunk selection. The window is opened by writing a low watermark, then the chunks are selected, and the window is closed by writing a high watermark. As the execution position (e.g., the specific log position on change log 127 where the chunk selection executes) is unknown, all selected chunk rows, which collide with log events 128 within that window, are removed. This ensures that the chunk selection cannot override the history of log changes. In some embodiments, CDCLog process instance 145 reads the table state from the time of the low watermark write, or later. In some embodiments, CDCLog process instance 145 sees the changes that committed before execution of the chunk selection. In some embodiments, CDCLog process instance(s) executes the chunk selection before writing the high watermark in watermark table 125. In some embodiments, CDCLog process instance(s) repeats algorithm 1 as long as table(s) 122 have remaining chunks 152.

Figure 2:
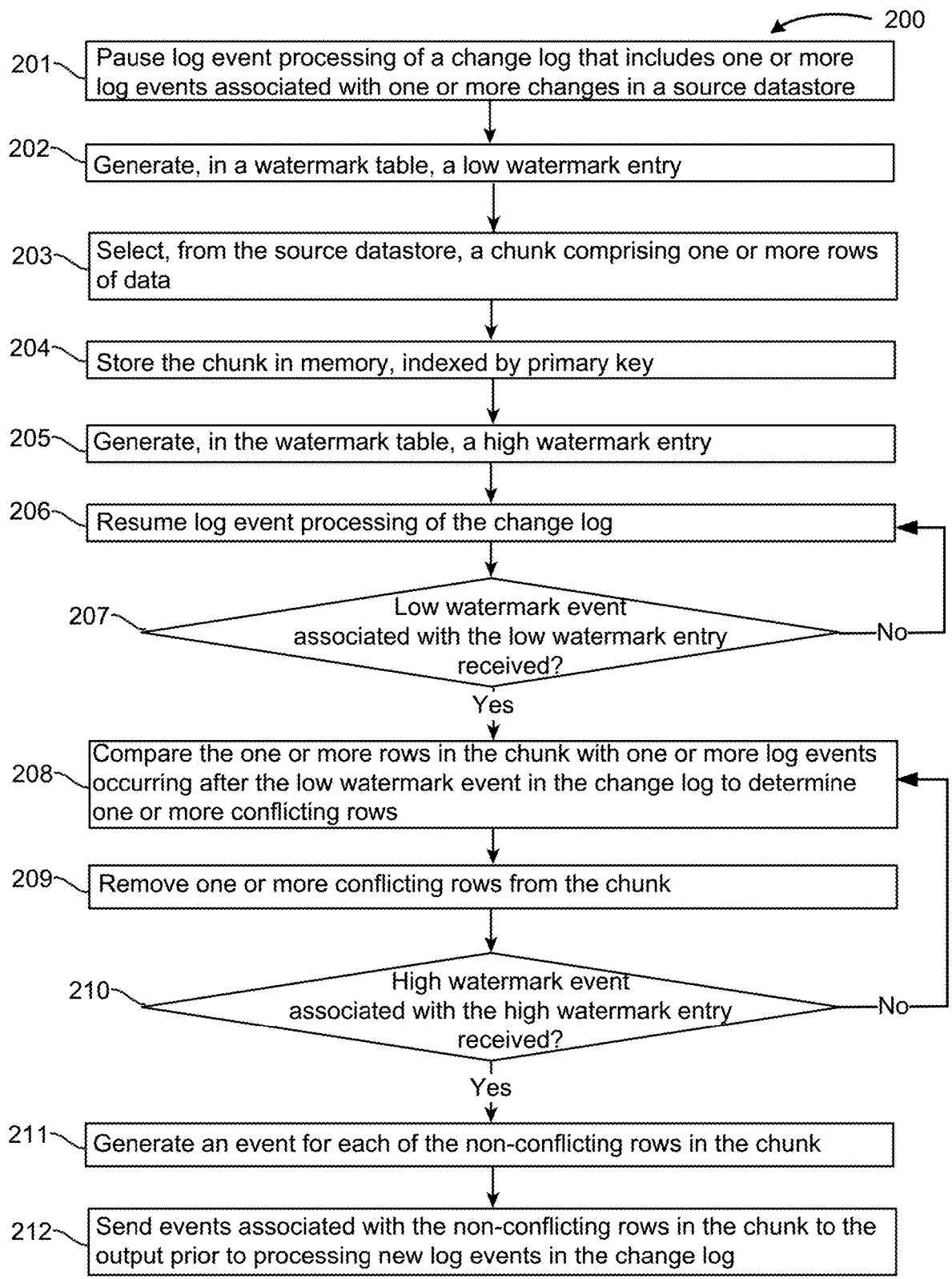
FIG. 2 is a flowchart of method steps 200 for watermark based log and dump processing on computing system 100, according to various embodiments of the present disclosure.

FIG. 2 is a flowchart of method steps 200 for watermark based log and dump processing on computing system 100, according to various embodiments of the present disclosure. Although the method steps are described in conjunction with the system of FIG. 1, persons skilled in the art will understand that any system configured to perform the method steps in any order falls within the scope of the present disclosure.

In step 201, CDCLog process instance 145 pauses the log event processing of change log 127 that includes one or more log events 128 associated with one or more changes in source datastore(s) 120. In some embodiments, CDCLog process instance 145 pauses transmission of one or more log events 128 to sink datastore(s) 160. In some embodiments, CDCLog process instance 145 pauses log event processing of change log 127 for a period of time determined based on the tradeoff between executing the watermark update and chunk selection and the need to avoid caching log event entries. In some embodiments, CDCLog process instance 145 pauses log event processing of change log 127 for a period of time based on a tradeoff between chunk size required to advance chunk processing and high availability requirements for the propagation of real-time changes. In some embodiments, CDCLog process instance 145 pauses log event processing for a period of time based on user defined runtime configuration settings or the like.

In step 202, when the log event processing is paused, CDCLog process instance 145 generates, in watermark table 125, a low watermark entry. In some embodiments, generating the low watermark entry includes updating the watermark table 125 using a single write operation. In some embodiments, CDCLog process instance 145 generates the low watermark entry by updating a row in watermark table 125 to reflect a specific UUID value.

In step 203, CDCLog process instance 145 selects, from source datastore(s) 120, chunk 152 comprising one or more rows of data. In some embodiments, CDCLog process instance 145 selects a chunk 152 associated with committed changes in source datastore(s) 120 up to a specific point in history corresponding to the log entry associated with the generation of the low watermark entry or later, such as writes that committed after the log entry associated with the generation of the low watermark entry but before the chunk selection. In some embodiments, the chunk selection can be paused, throttled, or resumed at any time. In some embodiments, CDCLog process instance 145 selects chunk 152 based on dump processing status information (e.g., progress tracking information associated with the last completed chunk). For instance, if dump processing was paused prior to completion, CDCLog process instance 145 executes the chunk selection by resuming processing from the last completed chunk without needing to start from the beginning. In some embodiments, chunk 152 comprises data from a specific table 122, across all tables 122, for a specific set of primary keys of a table 122, or the like. In some embodiments, the chunk selection runs without using locks on tables or blocking read or write traffic on one or more tables of source datastore(s) 120.

In step 204, CDCLog process instance 145 stores chunk 152 in memory, indexed by primary key. In some embodiments, chunk 152 is stored automatically based on data acquired from sensors located on one or more I/O devices 108. For instance, chunk 152 can be stored based on the sensor capturing the user voicing a save command, motion and/or a gesture by the user associated with the initiation of storage of chunk 152, a user interaction with an input device, and/or the like.

In step 205, CDCLog process instance 145 generates, in watermark table 125, a high watermark entry. In some embodiments, generating the high watermark entry includes updating the watermark table 125 using a single write operation. In some embodiments, CDCLog process instance 145 generates the high watermark entry by updating a row in watermark table 125 to reflect a specific UUID value.

In step 206, CDCLog process instance 145 resumes log event processing of change log 127. In some embodiments, CDCLog process instance 145 resumes transmission of any further log events 128 in change log 127 to sink datastore(s) 160. In some embodiments, log event(s) 128 are of one or more types including create, update, delete, or the like associated with one or more primary keys. In some embodiments, CDCLog process instance 145 resumes processing event-by-event without needing to cache log event entries in change log 127.

In step 207, CDCLog process instance 145 determines whether a low watermark event associated with the low watermark entry has been received. In some embodiments, CDCLog process instance 145 compares one or more log events 128 with the UUID associated with a low watermark entry in watermark table 125. When CDCLog process instance 145 determines that a low watermark event has been received, the procedure advances to step 208. When CDCLog process instance 145 determines that a low watermark event has not been received, the procedure reverts to step 206.

In step 208, when a low watermark event has been received, CDCLog process instance 145 compares the one or more rows in chunk 152 with one or more log events 128 occurring after the low watermark event in the change log 127 to determine one or more conflicting rows. In some embodiments, CDCLog process instance 145 compares one or more primary keys associated with one or more rows in chunk 152 to one or more primary keys associated with one or more log events 128 occurring after the low watermark event. In some embodiments, CDCLog process instance 145 identifies one or more conflicting rows when one or more rows in chunk 152 have one or more primary keys that match one or more log events 128 when the one or more primary keys overlap. In some embodiments, conflicting rows include one or more rows in chunk 152 that have identical primary keys (e.g., same primary key value or the like) as the one or more log events 128. In some embodiments, non-conflicting rows include one or more rows in chunk 152 whose primary keys do not overlap or match any primary key in the one or more log events 128.

In step 209, CDCLog process instance 145 removes one or more conflicting rows from chunk 152. In some embodiments, the one or more conflicting rows in chunk 152 are removed automatically based on data acquired from sensors located on one or more I/O devices 108. For instance, one or more conflicting rows can be removed based on the sensor capturing the user voicing a remove command, motion and/or a gesture by the user associated with the initiation of removal of the one or more conflicting rows, a user interaction with an input device, and/or the like.

In step 210, CDCLog process instance 145 determines whether a high watermark event associated with the high watermark entry has been received. In some embodiments, CDCLog process instance 145 compares one or more log events 128 with the UUID associated with a high watermark entry in watermark table 125. When CDCLog process instance 145 determines that a high watermark event has been received, the procedure advances to step 211. When CDCLog process instance 145 determines that a high watermark event has not been received, the procedure reverts to step 208.

In step 211, when a high watermark event has been received, CDCLog process instance 145 uses output writer 144 to generate an event for each of the non-conflicting rows in chunk 152. In some embodiments, the generated events are serialized in the same format as log events 128 in change log 127, in a customized format, or the like.

In step 212, CDCLog process instance 145 send events associated with the non-conflicting rows in chunk 152 to the output prior to processing any further log events in change log 127. In some embodiments, CDCLog process instance 145 uses output writer 144 to append the events associated with the non-conflicting rows in chunk 152 to output buffer 154. In some events, output writer 144 appends events to output buffer 154 using one thread, and uses another thread to consume the events from the output buffer 154 and send them to the output (e.g., sink datastore(s) 160), thereby allowing CDCLog process instance 145 to resume regular log event processing of events that occur after the high watermark event. In some embodiments, events occurring up to the high watermark event are appended to the output buffer 154 first. Then, events associated with the non-conflicting rows in chunk 152 are appended to the output buffer 154 in order prior to appending any log events occurring after the high watermark event.

Figure 3A:
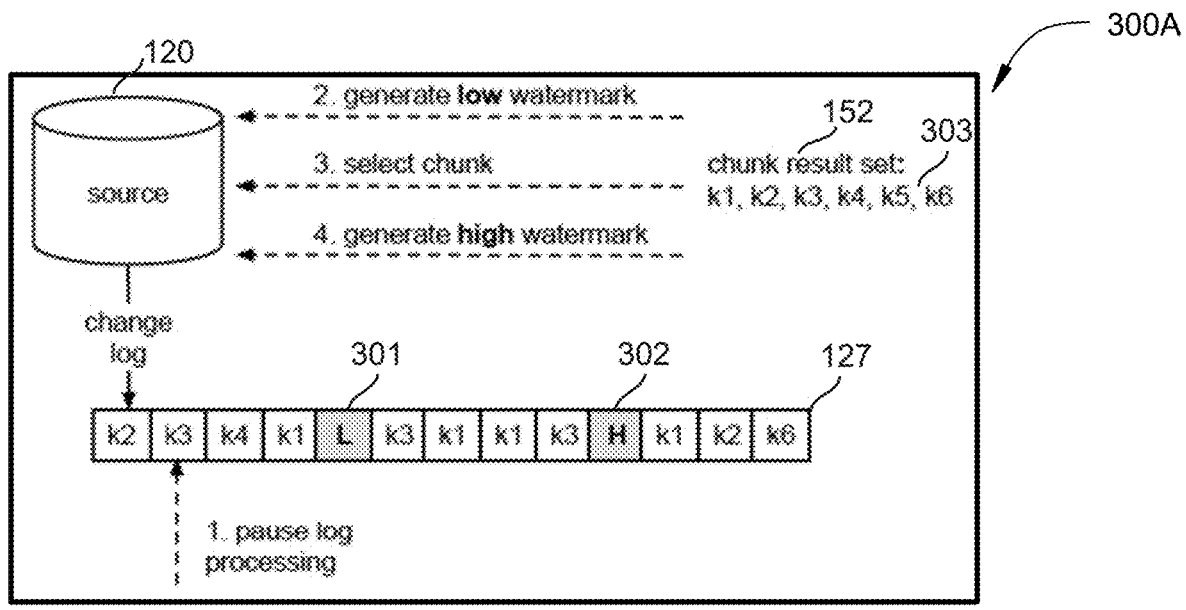
FIG. 3A is an example implementation 300A of log and dump processing techniques on computing system 100, according to various embodiments of the present disclosure.

FIG. 3A is an example implementation 300A of log and dump processing techniques on computing system 100, according to various embodiments of the present disclosure. Although the method steps are described in conjunction with the system of FIG. 1, persons skilled in the art will understand that any system configured to perform the method steps in any order falls within the scope of the present disclosure.

Steps 1-4 illustrate watermark generation and chunk selection. In step 1, CDCLog process instance 145 pauses log processing of change log 127. In steps 2 and 4, CDCLog process instance 145 generates a low watermark and a high watermark respectively in a watermark table 125 (not illustrated) in source datastore 120, creating two change events associated with watermark events 301 and 302 which are eventually received via change log 127. In step 3, CDCLog process instance 145 selects a chunk 152 including a chunk result set 303 comprising rows associated with primary keys k1, k2, k3, k4, k5, k6.

Figure 3B:
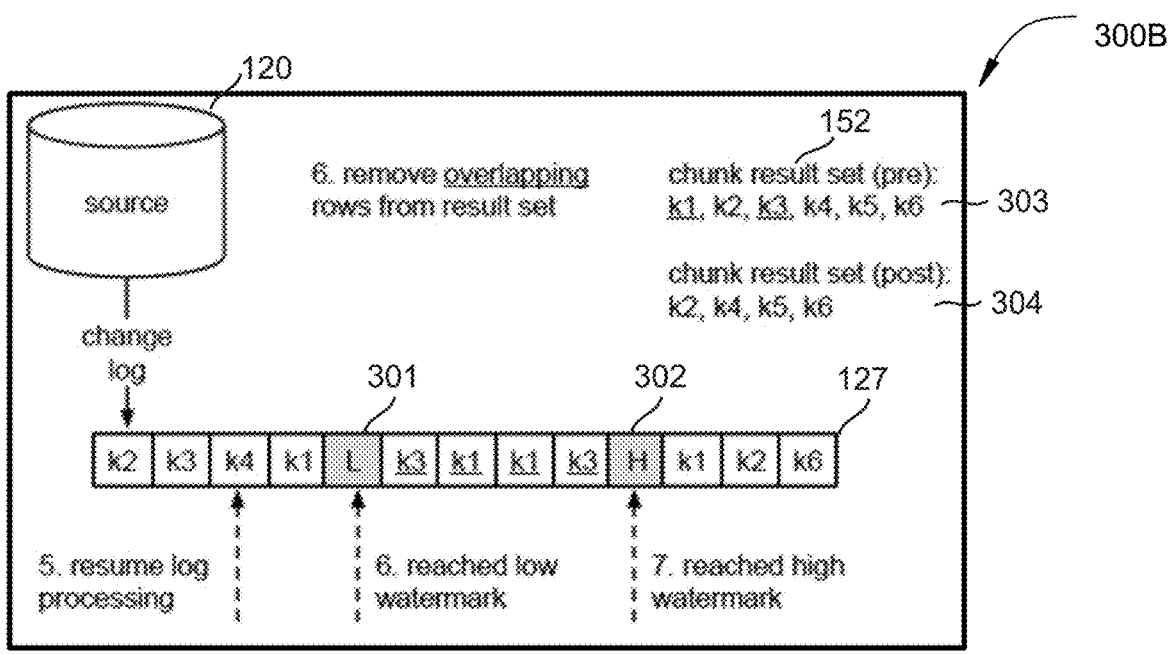
FIG. 3B is an example implementation 300B of log and dump processing techniques on computing system 100, according to various embodiments of the present disclosure.

FIG. 3B is an example implementation 300B of log and dump processing techniques on computing system 100, according to various embodiments of the present disclosure. Although the method steps are described in conjunction with the system of FIG. 1, persons skilled in the art will understand that any system configured to perform the method steps in any order falls within the scope of the present disclosure.

Steps 5-7 illustrate processing of chunk 152 between the watermark events 301 and 302. In step 5, CDCLog process instance 145 resumes log processing of change log 127. In step 6, when CDCLog process instance 145 determines that a low watermark event 301 has been reached, CDCLog process instance 145 compares the one or more rows in chunk result set 303 with one or more log events occurring after the low watermark event 301 in the change log 127 to determine one or more conflicting rows. In some embodiments, CDCLog process instance 145 removes rows in chunk result set 303 that have the same primary keys as log events occurring between watermark events 301 and 302 in change log 127. For instance, CDCLog process instance 145 removes rows associated with primary keys k1 and k3 from the chunk result set 303, with the remaining rows being included in chunk result set 304. In step 7, when CDCLog process instance 145 determines that a high watermark event 302 has been reached, CDCLog process instance 145 concludes the chunk result set processing performed in step 6.

Figure 4:
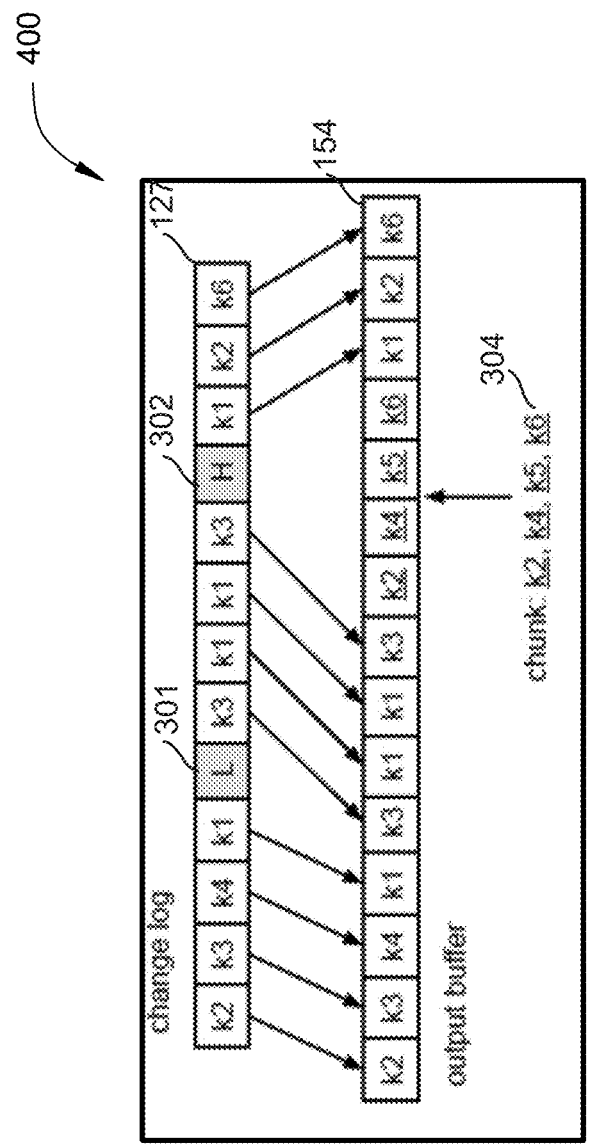
FIG. 4 is an example implementation 400 of log and dump processing techniques on computing system 100, according to various embodiments of the present disclosure.

FIG. 4 is an example implementation 400 of log and dump processing techniques on computing system 100, according to various embodiments of the present disclosure. Although the method steps are described in conjunction with the system of FIG. 1, persons skilled in the art will understand that any system configured to perform the method steps in any order falls within the scope of the present disclosure.

After the high watermark event 302 has been reached, CDCLog process instance 145 uses output writer 144 to generate events associated with chunk result set 304. CDCLog process instance 145 then uses output writer 144 to append the events associated with chunk result set 304 to output buffer 154. In some events, output writer 144 appends events to output buffer 154 using one thread, and uses another thread to consume the events from the output buffer 154 and send them to the output (e.g., sink datastore(s) 160), thereby allowing CDCLog process instance 145 to resume regular log event processing of events that occur after the high watermark event 302. In some embodiments, events occurring up to high watermark event 302 are appended to the output buffer first. Then, events associated with the chunk result set 404 are appended to the output buffer in order prior to appending any log events occurring after high watermark event 302 (e.g., k1, k2, k6). As a result, log and dump events are interleaved in the output buffer. Events in the output buffer are delivered to sink datastore(s) 160 in order.

Figure 5:
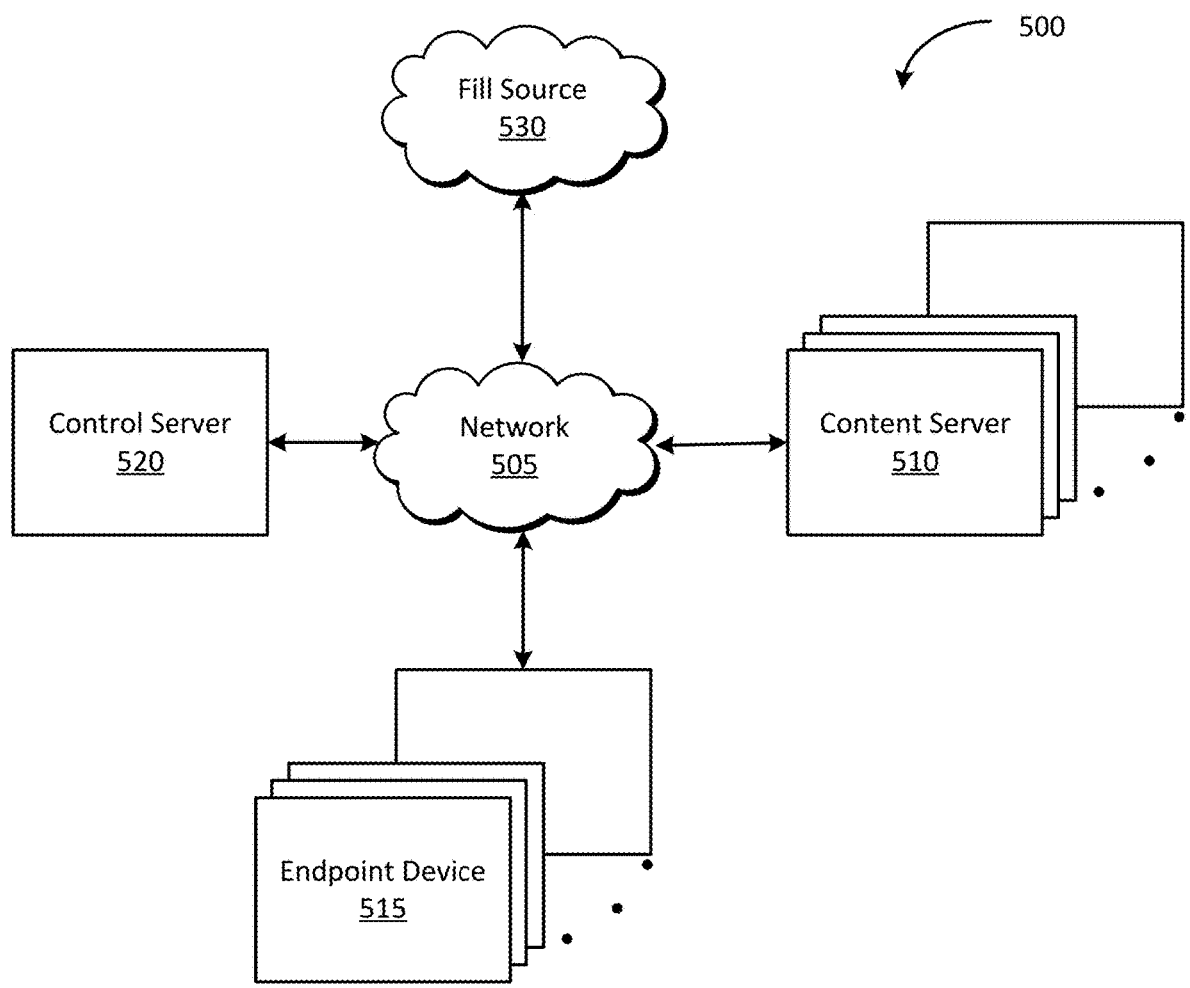
FIG. 5 illustrates a network infrastructure 500 used to distribute content to content servers and endpoint devices, according to various embodiments of the present disclosure.

FIG. 5 illustrates a network infrastructure 500 used to distribute content to content servers 510 and endpoint devices 515, according to various embodiments of the invention. As shown, the network infrastructure 500 includes content servers 510, control server 520, and endpoint devices 515, each of which are connected via a network 505.

Each endpoint device 515 communicates with one or more content servers 510 (also referred to as "caches" or "nodes") via the network 505 to download content, such as textual data, graphical data, audio data, video data, and other types of data. The downloadable content, also referred to herein as a "file," is then presented to a user of one or more endpoint devices 515. In various embodiments, the endpoint devices 515 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 510 may include a web-server, database, and server application 617 configured to communicate with the control server 520 to determine the location and availability of various files that are tracked and managed by the control server 520. Each content server 510 may further communicate with a fill source 530 and one or more other content servers 510 in order "fill" each content server 510 with copies of various files. In addition, content servers 510 may respond to requests for files received from endpoint devices 515. The files may then be distributed from the content server 510 or via a broader content distribution network. In some embodiments, the content servers 510 enable users to authenticate (e.g., using a username and password) in order to access files stored on the content servers 510. Although only a single control server 520 is shown in FIG. 5, in various embodiments multiple control servers 520 may be implemented to track and manage files.

In various embodiments, the fill source 530 may include an online storage service (e.g., Amazon® Simple Storage Service, Google® Cloud Storage, etc.) in which a catalog of files, including thousands or millions of files, is stored and accessed in order to fill the content servers 510. Although only a single fill source 530 is shown in FIG. 5, in various embodiments multiple fill sources 530 may be implemented to service requests for files. Further, as is well-understood, any cloud-based services can be included in the architecture of FIG. 5 beyond fill source 530 to the extent desired or necessary.

Figure 6:
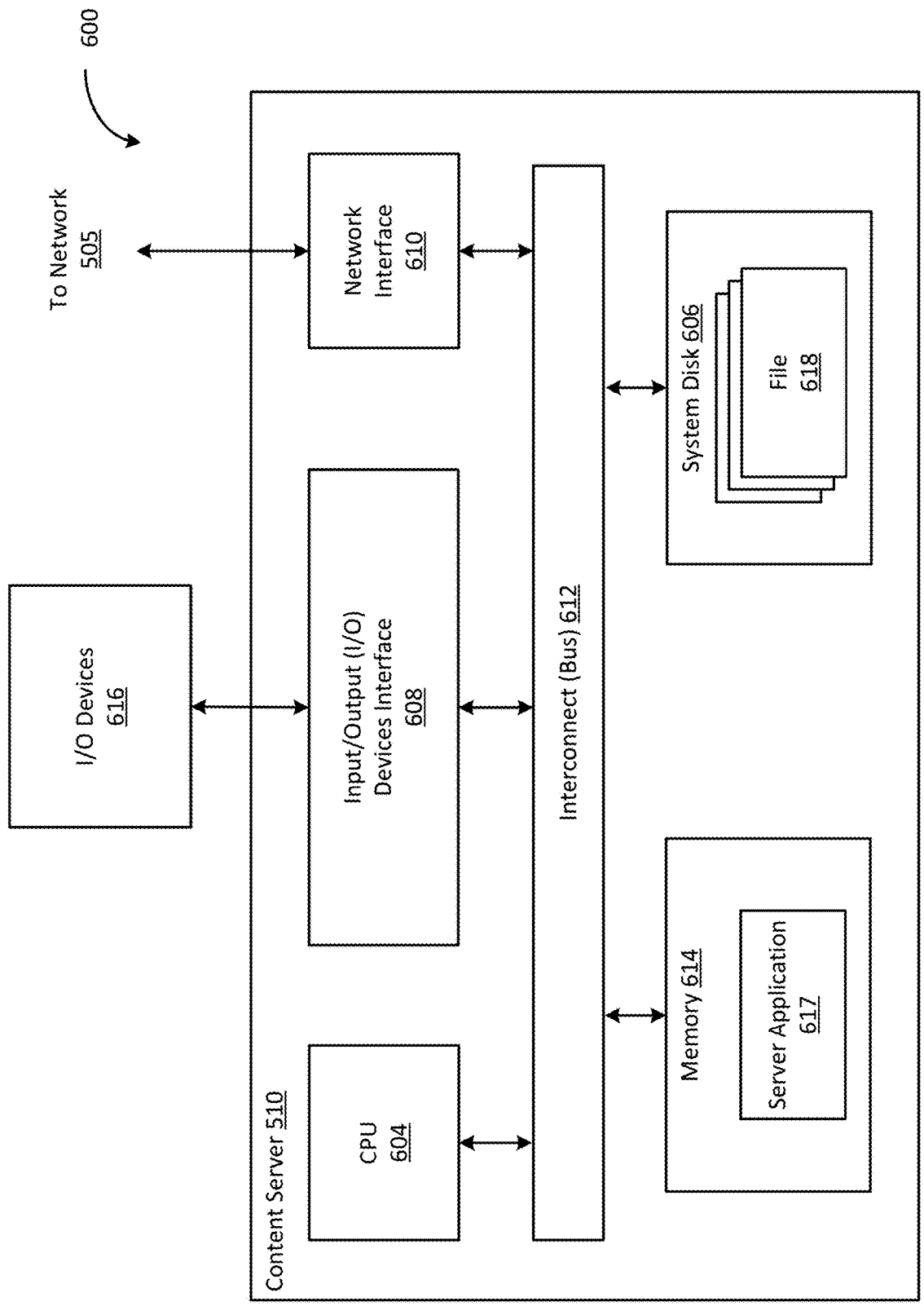
FIG. 6 is a block diagram of a content server 600 that may be implemented in conjunction with the network infrastructure of FIG. 5, according to various embodiments of the present disclosure.

FIG. 6 is a block diagram of a content server 510 that may be implemented in conjunction with the network infrastructure 500 of FIG. 5, according to various embodiments of the present invention. As shown, the content server 510 includes, without limitation, a central processing unit (CPU) 604, a system disk 606, an input/output (I/O) devices interface 608, a network interface 610, an interconnect 612, and a system memory 614.

The CPU 604 is configured to retrieve and execute programming instructions, such as server application 617, stored in the system memory 614. Similarly, the CPU 604 is configured to store application data (e.g., software libraries) and retrieve application data from the system memory 614. The interconnect 612 is configured to facilitate transmission of data, such as programming instructions and application data, between the CPU 604, the system disk 606, I/O devices interface 608, the network interface 610, and the system memory 614. The I/O devices interface 608 is configured to receive input data from I/O devices 616 and transmit the input data to the CPU 604 via the interconnect 612. For example, I/O devices 616 may include one or more buttons, a keyboard, a mouse, and/or other input devices. The I/O devices interface 608 is further configured to receive output data from the CPU 604 via the interconnect 612 and transmit the output data to the I/O devices 616.

The system disk 606 may include one or more hard disk drives, solid state storage devices, or similar storage devices. The system disk 606 is configured to store non-volatile data such as files 618 (e.g., audio files, video files, subtitles, application files, software libraries, etc.). The files 618 can then be retrieved by one or more endpoint devices 515 via the network 505. In some embodiments, the network interface 610 is configured to operate in compliance with the Ethernet standard.

The system memory 614 includes a server application 617 configured to service requests for files 618 received from endpoint device 515 and other content servers 510. When the server application 617 receives a request for a file 618, the server application 617 retrieves the corresponding file 618 from the system disk 606 and transmits the file 618 to an endpoint device 515 or a content server 510 via the network 505.

Figure 7:
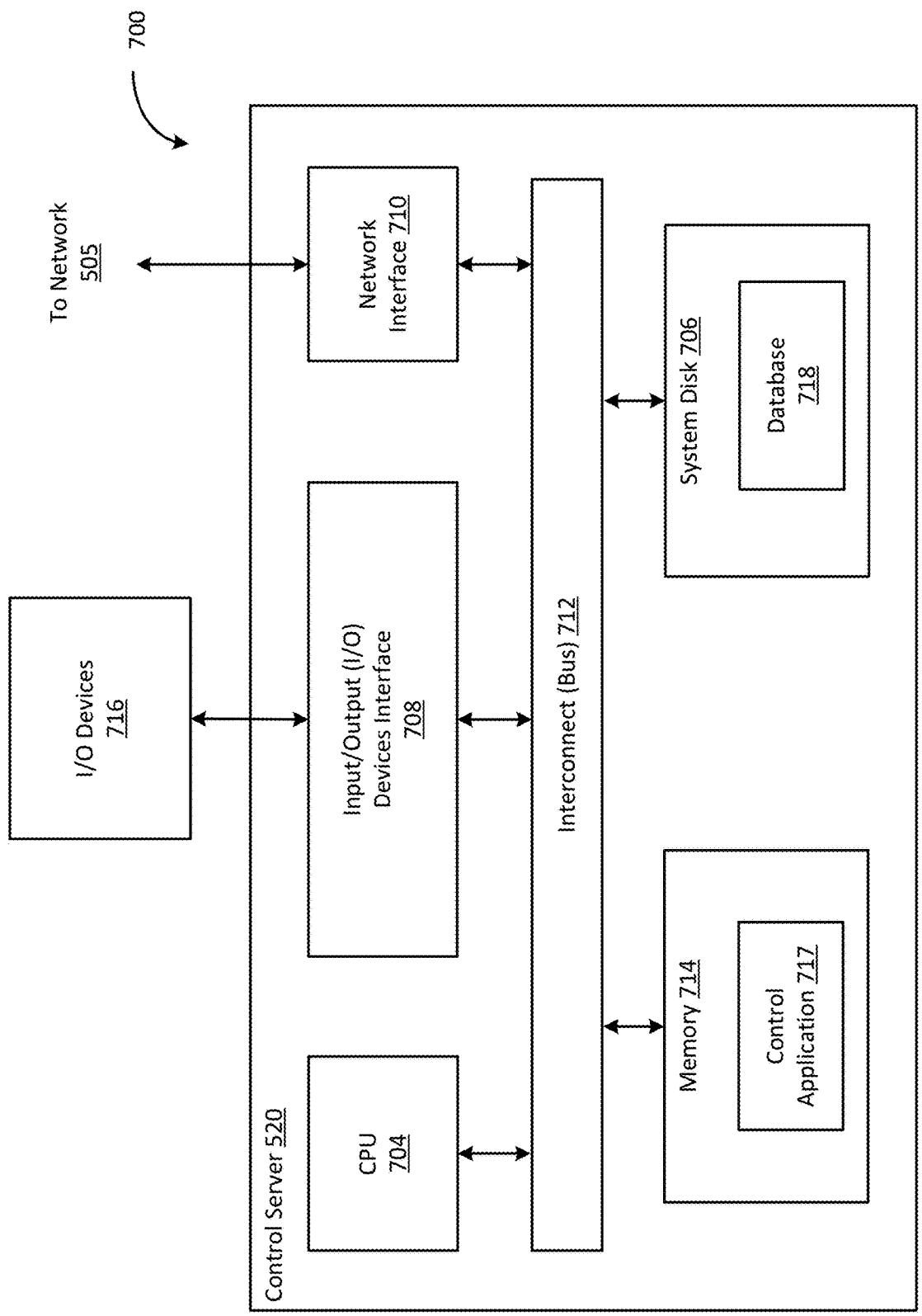
FIG. 7 is a block diagram of a control server 700 that may be implemented in conjunction with the network infrastructure of FIG. 5, according to various embodiments of the present disclosure.

FIG. 7 is a block diagram of a control server 520 that may be implemented in conjunction with the network infrastructure 500 of FIG. 5, according to various embodiments of the present invention. As shown, the control server 520 includes, without limitation, a central processing unit (CPU) 704, a system disk 706, an input/output (I/O) devices interface 708, a network interface 710, an interconnect 712, and a system memory 714.

The CPU 704 is configured to retrieve and execute programming instructions, such as control application 717, stored in the system memory 714. Similarly, the CPU 704 is configured to store application data (e.g., software libraries) and retrieve application data from the system memory 714 and a database 718 stored in the system disk 706. The interconnect 712 is configured to facilitate transmission of data between the CPU 704, the system disk 706, I/O devices interface 708, the network interface 710, and the system memory 714. The I/O devices interface 708 is configured to transmit input data and output data between the I/O devices 716 and the CPU 704 via the interconnect 712. The system disk 706 may include one or more hard disk drives, solid state storage devices, and the like. The system disk 706 is configured to store a database 718 of information associated with the content servers 510, the fill source(s) 530, and the files 618.

The system memory 714 includes a control application 717 configured to access information stored in the database 718 and process the information to determine the manner in which specific files 618 will be replicated across content servers 510 included in the network infrastructure 500. The control application 717 may further be configured to receive and analyze performance characteristics associated with one or more of the content servers 510 and/or endpoint devices 515.

Figure 8:
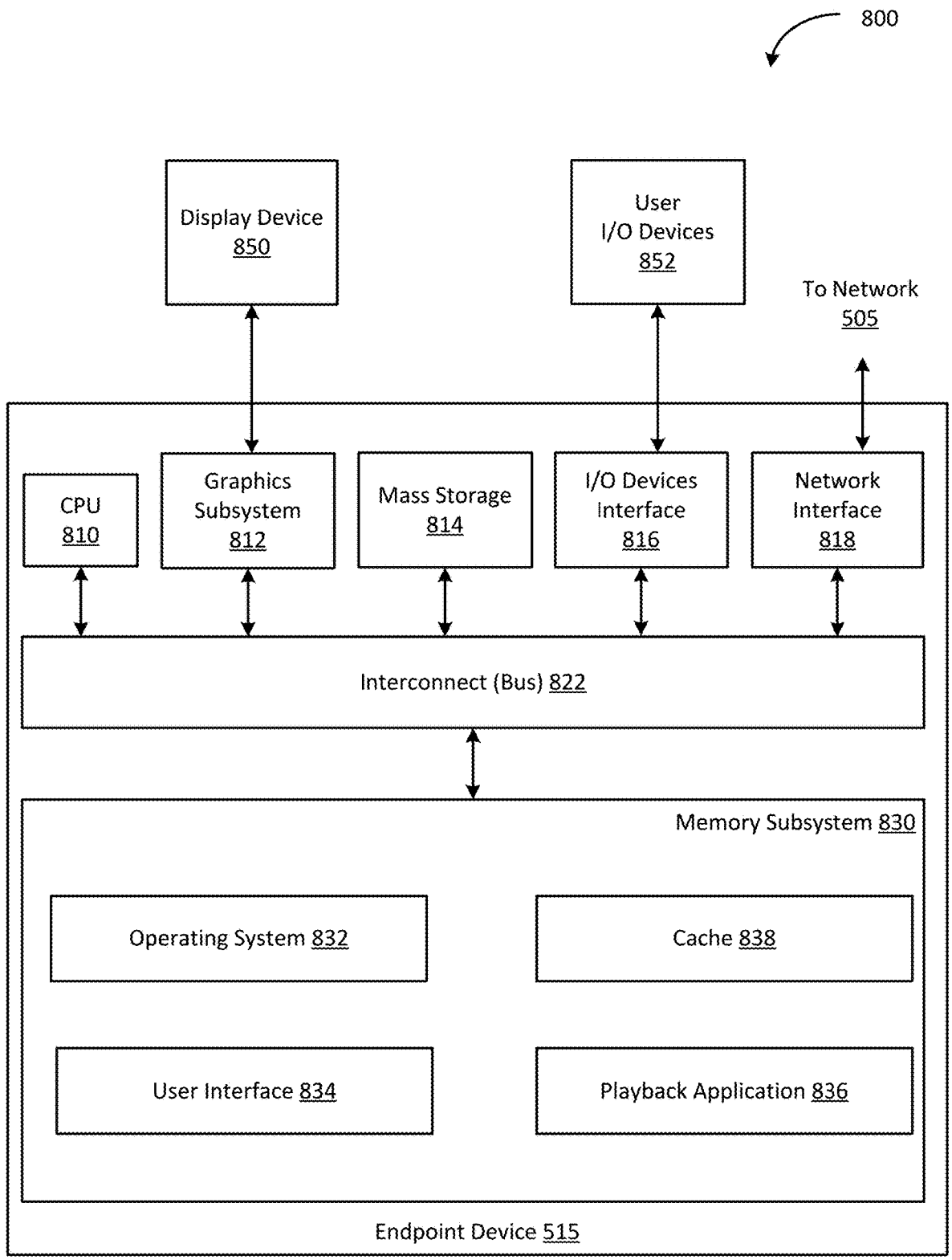
FIG. 8 is a block diagram of an endpoint device 800 that may be implemented in conjunction with the network infrastructure of FIG. 5, according to various embodiments of the present disclosure.

FIG. 8 is a block diagram of an endpoint device 515 that may be implemented in conjunction with the network infrastructure 500 of FIG. 5, according to various embodiments of the present invention. As shown, the endpoint device 515 may include, without limitation, a CPU 810, a graphics subsystem 812, an I/O device interface 814, a mass storage unit 816, a network interface 818, an interconnect 822, and a memory subsystem 830.

In some embodiments, the CPU 810 is configured to retrieve and execute programming instructions stored in the memory subsystem 830. Similarly, the CPU 810 is configured to store and retrieve application data (e.g., software libraries) residing in the memory subsystem 830. The interconnect 822 is configured to facilitate transmission of data, such as programming instructions and application data, between the CPU 810, graphics subsystem 812, I/O devices interface 814, mass storage unit 816, network interface 818, and memory subsystem 830.

In some embodiments, the graphics subsystem 812 is configured to generate frames of video data and transmit the frames of video data to display device 850. In some embodiments, the graphics subsystem 812 may be integrated into an integrated circuit, along with the CPU 810. The display device 850 may comprise any technically feasible means for generating an image for display. For example, the display device 850 may be fabricated using liquid crystal display (LCD) technology, cathode-ray technology, and light-emitting diode (LED) display technology. An input/output (I/O) device interface 814 is configured to receive input data from user I/O devices 852 and transmit the input data to the CPU 810 via the interconnect 822. For example, user I/O devices 852 may comprise one of more buttons, a keyboard, and a mouse or other pointing device. The I/O device interface 814 also includes an audio output unit configured to generate an electrical audio output signal. User I/O devices 852 includes a speaker configured to generate an acoustic output in response to the electrical audio output signal. In alternative embodiments, the display device 850 may include the speaker. A television is an example of a device known in the art that can display video frames and generate an acoustic output.

A mass storage unit 816, such as a hard disk drive or flash memory storage drive, is configured to store non-volatile data. A network interface 818 is configured to transmit and receive packets of data via the network 505. In some embodiments, the network interface 818 is configured to communicate using the well-known Ethernet standard. The network interface 818 is coupled to the CPU 810 via the interconnect 822.

In some embodiments, the memory subsystem 830 includes programming instructions and application data that comprise an operating system 832, a user interface 834, and a playback application 836. The operating system 832 performs system management functions such as managing hardware devices including the network interface 818, mass storage unit 816, I/O device interface 814, and graphics subsystem 812. The operating system 832 also provides process and memory management models for the user interface 834 and the playback application 836. The user interface 834, such as a window and object metaphor, provides a mechanism for user interaction with endpoint device 515. Persons skilled in the art will recognize the various operating systems and user interfaces that are well-known in the art and suitable for incorporation into the endpoint device 515.

In some embodiments, the playback application 836 is configured to request and receive content from the content server 510 via the network interface 818. Further, the playback application 836 is configured to interpret the content and present the content via display device 850 and/or user I/O devices 852.

In sum, watermark based log and dump processing begins when CDCLog process instance 145 pauses the log event processing of change log 127 that includes one or more log events 128 associated with one or more changes in source datastore(s) 120. When the log event processing is paused, CDCLog process instance 145 generates, in watermark table 125, a low watermark entry. CDCLog process instance 145 selects, from source datastore(s) 120, chunk 152 comprising one or more rows of data. CDCLog process instance 145 stores chunk 152 in memory, indexed by primary key. CDCLog process instance 145 generates, in watermark table 125, a high watermark entry and then resumes log event processing of any further log events in change log 127. CDCLog process instance 145 determines whether a low watermark event associated with the low watermark entry has been received. When a low watermark event has been received, CDCLog process instance 145 compares the one or more rows in chunk 152 with one or more log events 128 occurring after the low watermark event in the change log 127 to determine one or more conflicting rows. CDCLog process instance 145 removes one or more conflicting rows from chunk 152. CDCLog process instance 145 determines whether a high watermark event associated with the high watermark entry has been received. When a high watermark event has been received, CDCLog process instance 145 generates an event for each of the non-conflicting rows in chunk 152. CDCLog process instance 145 send events associated with the non-conflicting rows in chunk 152 to the output (e.g., sink datastore(s) 160) prior to processing any further log events in change log 127.

Disclosed techniques allow for concurrent log and dump processing, enabling high availability of real-time events to downstream consumers, and reducing propagation delays from the source datastore to the derived datastores by capturing dumps reflecting the full state of the source datastore via chunks interleaved with the real-time events. Disclosed techniques also allow downstream customers to trigger, pause, or resume dumps after the last completed chunk at any time, thereby allow for real-time and efficient customization of the log and dump processing without needing to restart the dump processing from the beginning. Additionally, disclosed techniques do not require locks on tables, thereby minimizing the impact on bandwidth and write traffic in databases. Further, disclosed techniques can be configured for a variety of relational databases, allowing for consistent behavior when deployed in heterogeneous multi-datastore environments that contain different kinds of database systems.

1. In some embodiments, a computer-implemented method for concurrent log and dump processing comprises: selecting, from a datastore, a chunk comprising one or more rows of data; comparing the one or more rows of data in the chunk with a first set of log events in a change log associated with the datastore, wherein each log event included in the first set of log events occurs after a first log event in the change log and prior to a second log event in the change log; selecting, based on the comparison, one or more non-conflicting rows in the chunk; and transmitting, to an output, one or more log events associated with the one or more non-conflicting rows in the chunk prior to processing a second set of log events in the change log, wherein the second set of log events occur after the second log event.

2. The computer-implemented method of clause 1, further comprising: appending, to an output buffer associated with the output, the one or more log events associated with the one or more non-conflicting rows in the chunk, wherein the one or more log events are appended to the output buffer after the first set of log events and before the second set of log events.

3. The computer-implemented method of clauses 1 or 2, wherein the one or more log events associated with the one or more non-conflicting rows in the chunk are serialized in the same format as the first set of log events.

4. The computer-implemented method of clauses 1-3, wherein the first log event is associated with generating a low watermark on a watermark table, and wherein the second log event is associated with generating a high watermark on the watermark table.

5. The computer-implemented method of clauses 1-4, wherein generating a low watermark comprises updating a row in the watermark table to reflect a specific universally unique identifier (UUID) value.

6. The computer-implemented method of clauses 1-5, wherein the chunk is selected after the first log event and prior to the second log event.

7. The computer-implemented method of clauses 1-6, wherein the chunk is selected in response to pausing processing of the change log.

8. The computer-implemented method of clauses 1-7, further comprising: removing or more conflicting rows from the chunk based on the comparison.

9. The computer-implemented method of clauses 1-8, wherein the comparison is performed in response to resuming processing of the change log.

10. The computer-implemented method of clauses 1-9, wherein the comparison further comprises comparing one or more primary keys of the one or more rows to one or more primary keys of one or more log events in the first set of log events.

11. In some embodiments, one or more non-transitory computer readable media storing instructions that, when executed by one or more processors, cause the one or more processors to perform the steps of: selecting, from a datastore, a chunk comprising one or more rows of data; comparing one or more rows of data in the chunk with a first set of log events in a change log associated with the datastore, wherein the first set of log events occur after a first log event in the change log and prior to a second log event in the change log; selecting, based on the comparison, one or more non-conflicting rows in the chunk; and transmitting, to an output, one or more log events associated with the one or more non-conflicting rows in the chunk prior to processing a second set of log events in the change log, wherein the second set of log events occur after the second log event.

12. The one or more non-transitory computer readable media of clause 11, further comprising: appending, to an output buffer associated with the output, the one or more log events associated with the one or more non-conflicting rows in the chunk, wherein the one or more log events are appended after the first set of log events and before the second set of log events.

13. The one or more non-transitory computer readable media of clauses 11 or 12, wherein the one or more log events associated with the one or more non-conflicting rows in the chunk are serialized in the same format as the first set of log events.

14. The one or more non-transitory computer readable media of clauses 11-13, wherein the first log event is associated with generating a low watermark on a watermark table, and wherein the second log event is associated with generating a high watermark on the watermark table.

15. The one or more non-transitory computer readable media of clauses 11-14, wherein generating a low watermark comprises updating a row in the watermark table to reflect a specific universally unique identifier (UUID) value.

16. The one or more non-transitory computer readable media of clauses 11-15, wherein the chunk is selected after the first log event and prior to the second log event.

17. The one or more non-transitory computer readable media of clauses 11-16, wherein the chunk is selected in response to pausing processing of the change log.

18. The one or more non-transitory computer readable media of clauses 11-17, further comprising: removing or more conflicting rows from the chunk based on the comparison.

19. The one or more non-transitory computer readable media of clauses 11-18, wherein the comparison is performed in response to resuming processing of the change log.

20. In some embodiments, a system comprises: a memory storing one or more software applications; and a processor that, when executing the one or more software applications, is configured to perform the steps of: selecting, from a datastore, a chunk comprising one or more rows of data; comparing one or more rows of data in the chunk with a first set of log events in a change log associated with the datastore, wherein the first set of log events occur after a first log event in the change log and prior to a second log event in the change log; selecting, based on the comparison, one or more non-conflicting rows in the chunk; and transmitting, to an output, one or more log events associated with the one or more non-conflicting rows in the chunk prior to processing a second set of log events in the change log, wherein the second set of log events occur after the second log event.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for concurrent log and dump processing, the method comprising:
   selecting, from a datastore, a chunk comprising one or more rows of data;
   comparing the one or more rows of data in the chunk with a first set of log events in a change log associated with the datastore, wherein each log event included in the first set of log events occurs after a first log event in the change log and prior to a second log event in the change log;
   selecting, based on the comparison, one or more non-conflicting rows in the chunk; and transmitting, to an output, one or more log events associated with the one or more non-conflicting rows in the chunk prior to processing a second set of log events in the change log, wherein the second set of log events occur after the second log event.

2. The computer-implemented method of claim 1, further comprising:
appending, to an output buffer associated with the output, the one or more log events associated with the one or more non-conflicting rows in the chunk, wherein the one or more log events are appended to the output buffer after the first set of log events and before the second set of log events.

3. The computer-implemented method of claim 2, wherein the one or more log events associated with the one or more non-conflicting rows in the chunk are serialized in the same format as the first set of log events.

4. The computer-implemented method of claim 1, wherein the first log event is associated with generating a low watermark on a watermark table, and wherein the second log event is associated with generating a high watermark on the watermark table.

5. The computer-implemented method of claim 4, wherein generating a low watermark comprises updating a row in the watermark table to reflect a specific universally unique identifier (UUID) value.

6. The computer-implemented method of claim 1, wherein the chunk is selected after the first log event and prior to the second log event.

7. The computer-implemented method of claim 1, wherein the chunk is selected in response to pausing processing of the change log.

8. The computer-implemented method of claim 1, further comprising:
removing or more conflicting rows from the chunk based on the comparison.

9. The computer-implemented method of claim 1, wherein the comparison is performed in response to resuming processing of the change log.

10. The computer-implemented method of claim 1, wherein the comparison further comprises comparing one or more primary keys of the one or more rows to one or more primary keys of one or more log events in the first set of log events.

11. One or more non-transitory computer readable media storing instructions that, when executed by one or more processors, cause the one or more processors to perform the steps of:
selecting, from a datastore, a chunk comprising one or more rows of data;
comparing one or more rows of data in the chunk with a first set of log events in a change log associated with the datastore, wherein the first set of log events occur after a first log event in the change log and prior to a second log event in the change log;
selecting, based on the comparison, one or more non-conflicting rows in the chunk; and
transmitting, to an output, one or more log events associated with the one or more non-conflicting rows in the chunk prior to processing a second set of log events in the change log, wherein the second set of log events occur after the second log event.

12. The one or more non-transitory computer readable media of claim 11, further comprising:
appending, to an output buffer associated with the output, the one or more log events associated with the one or more non-conflicting rows in the chunk, wherein the one or more log events are appended after the first set of log events and before the second set of log events.

13. The one or more non-transitory computer readable media of claim 12, wherein the one or more log events associated with the one or more non-conflicting rows in the chunk are serialized in the same format as the first set of log events.

14. The one or more non-transitory computer readable media of claim 11, wherein the first log event is associated with generating a low watermark on a watermark table, and wherein the second log event is associated with generating a high watermark on the watermark table.

15. The one or more non-transitory computer readable media of claim 14, wherein generating a low watermark comprises updating a row in the watermark table to reflect a specific universally unique identifier (UUID) value.

16. The one or more non-transitory computer readable media of claim 11, wherein the chunk is selected after the first log event and prior to the second log event.

17. The one or more non-transitory computer readable media of claim 11, wherein the chunk is selected in response to pausing processing of the change log.

18. The one or more non-transitory computer readable media of claim 11, further comprising:
removing or more conflicting rows from the chunk based on the comparison.

19. The one or more non-transitory computer readable media of claim 11, wherein the comparison is performed in response to resuming processing of the change log.

20. A system, comprising:
a memory storing one or more software applications; and
a processor that, when executing the one or more software applications, is configured to perform the steps of:
selecting, from a datastore, a chunk comprising one or more rows of data;
comparing one or more rows of data in the chunk with a first set of log events in a change log associated with the datastore, wherein the first set of log events occur after a first log event in the change log and prior to a second log event in the change log;
selecting, based on the comparison, one or more non-conflicting rows in the chunk; and
transmitting, to an output, one or more log events associated with the one or more non-conflicting rows in the chunk prior to processing a second set of log events in the change log, wherein the second set of log events occur after the second log event.

* * * * *